July 7, 1970  L. J. CUTRONA ET AL  3,519,331

TWO-DIMENSIONAL OPTICAL DATA PROCESSOR

Filed March 15, 1961  9 Sheets-Sheet 1

INVENTORS
LOUIS J. CUTRONA
WENDELL A. BLIKKEN
EMMETT N. LEITH
ARTHUR L. INGALLS
CARMEN J. PALERMO
LEONARD J. PORCELLO

BY *Wade Lount*
ATTORNEY

*Richard J. Killoran*
AGENT

INVENTORS
LOUIS J. CUTRONA
WENDELL A. BLIKKEN
EMMETT N. LEITH
ARTHUR L. INGALLS
CARMEN J. PALERMO
LEONARD J. PORCELLO

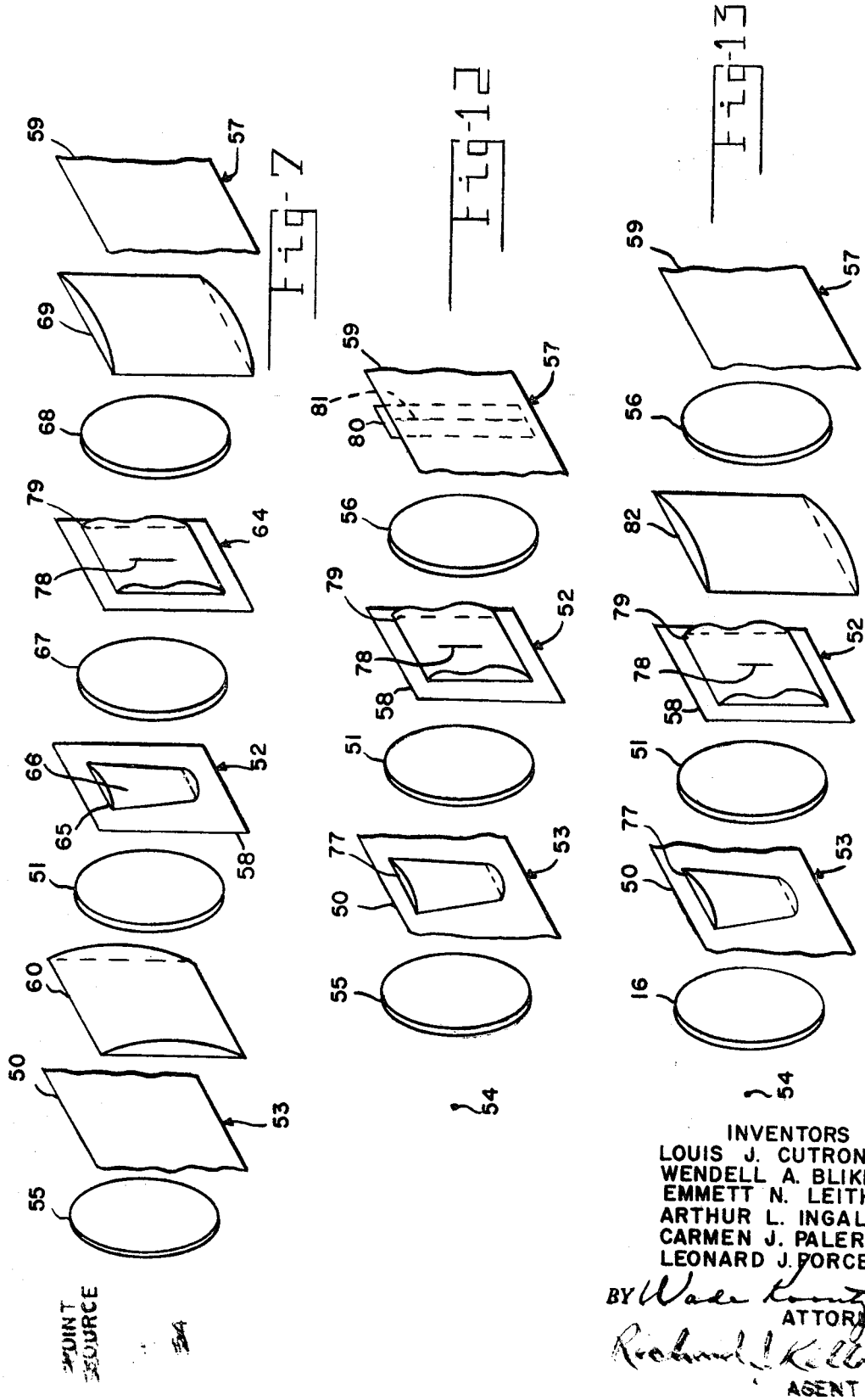

July 7, 1970   L. J. CUTRONA ET AL   3,519,331
TWO-DIMENSIONAL OPTICAL DATA PROCESSOR
Filed March 15, 1961   9 Sheets-Sheet 4

INVENTORS
LOUIS J. CUTRONA
WENDELL A. BLIKKEN
EMMETT N. LEITH
ARTHUR L. INGALLS
CARMEN J. PALERMO
LEONARD J. PORCELLO
BY
ATTORNEY
AGENT

July 7, 1970     L. J. CUTRONA ET AL     3,519,331

TWO-DIMENSIONAL OPTICAL DATA PROCESSOR

Filed March 15, 1961     9 Sheets-Sheet 5

INVENTORS
LOUIS J. CUTRONA
WENDELL A. BLIKKEN
EMMETT N. LEITH
ARTHUR L. INGALLS
CARMEN J. PALERMO
LEONARD J. PORCELLO

BY
ATTORNEY

AGENT

INVENTORS
LOUIS J. CUTRONA
WENDELL A. BLIKKEN
EMMETT N. LEITH
ARTHUR L. INGALLS
CARMEN J. PALERMO
LEONARD J. PORCELLO

BY *Wade Koonty*
ATTORNEY

*Richard J. Killoren*
AGENT

INVENTORS
LOUIS J. CUTRONA
WENDELL A. BLIKKEN
EMMETT N. LEITH
ARTHUR L. INGALLS
CARMEN J. PALERMO
LEONARD J. PORCELLO

INVENTORS
LOUIS J. CUTRONA
WENDELL A. BLIKKEN
EMMETT N. LEITH
ARTHUR L. INGALLS
CARMEN J. PALERMO
LEONARD J. PORCELLO

BY
ATTORNEY

July 7, 1970 L. J. CUTRONA ET AL 3,519,331
TWO-DIMENSIONAL OPTICAL DATA PROCESSOR
Filed March 15, 1961 9 Sheets—Sheet 9
a. CONVENTIONAL SIGNAL    b. FOLDED DOPPER    c. RANGE AMBIGUITY
PORTION OF DATA USED
d. FOLDED DOPPLER
Fig-26
PORTION OF DATA USED
e. DOPPLER AMBIGUITY
Fig-27
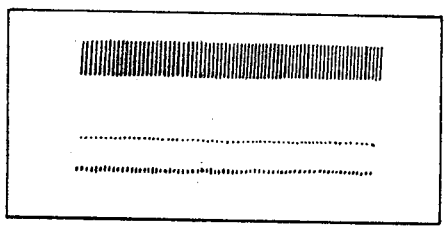
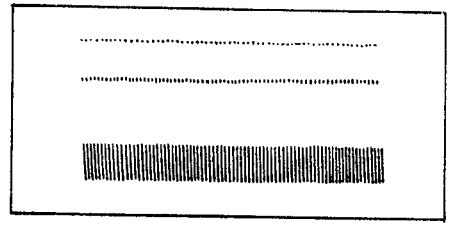
Fig-30
INVENTORS
LOUIS J. CUTRONA
WENDELL A. BLIKKEN
EMMETT N. LEITH
ARTHUR L. INGALLS
CARMEN J. PALERMO
LEONARD J. PORCELLO
BY
ATTORNEY
AGENT United States Patent Office
3,519,331
Patented July 7, 1970

3,519,331
TWO-DIMENSIONAL OPTICAL DATA PROCESSOR
Louis J. Cutrona, Ann Arbor, Wendell A. Blikken, Ypsilanti, Emmett N. Leith, Plymouth, Arthur L. Ingalls, Ann Arbor, Carmen J. Palermo, Ypsilanti, and Leonard J. Porcello, Ann Arbor, Mich., assignors to the United States of America as represented by the Secretary of the Air Force
Filed Mar. 15, 1961, Ser. No. 96,052
Int. Cl. G02b 5/18
U.S. Cl. 350—162                                    14 Claims This invention relates to a device for optically processing two-dimensional signal data.

One object of the invention is to provide a two-dimensional data processor for performing the operations of pulse compression and beam sharpening for radar data stored in the uncompressed form.

Another object of the invention is to provide a two-dimensional data processor which makes bandwidth reduction possible by the use of ambiguity reduction techniques.

Another object of the invention is to provide a two-dimensional data processor which makes it possible to remove the range variation term for radar data stored in uncompressed form on a film wherein a range signal history is recorded along a section of parabola instead of along a straight line.

These and other objects will be more fully understood from the following detailed description taken with the drawings wherein:

FIG. 7 is a three-dimensional view of an optical system for processing radar data in the frequency domain.

FIG. 12 is a three-dimensional view of an optical system for processing radar data partially in the frequency domain and partially in the spatial domain.

FIG. 13 is a three-dimensional view of a modification of the device of FIG. 12.

FIG. 21b shows the processed signal for the signal shown in FIG. 21a.

FIG. 22b shows the processed signal for the signal shown in FIG. 22a.

FIG. 23 is a graphical illustration of a record of a conventional two-dimensional Doppler radar signal.

FIG. 24 is a graphical illustration of a conventional Doppler radar signal folded over in azimuth.

FIG. 25 is a graphical illustration of a Doppler radar signal with range ambiguity.

FIG. 26 is a graphical illustration of a conventional Doppler signal folded in azimuth.

FIG. 27 is a graphical illustration of a Doppler radar signal similar to that shown in FIG. 26 with a different area of interest.

FIG. 30 is a graphical illustration of the processed signal for the signals of FIG. 29 showing the separation of the quadrature components.

When a lens is illuminated with coherent light, which in this application shall be considered as monochromatic light that may be collimated in the $x$ and $y$ direction, the light-amplitude distributions at the front and back focal planes are related by a two-dimensional Fourier transformation $$A_b(\omega_x,\omega_y) = \iint A_f(x,y)\exp\{j(\omega_x x + \omega_y y)\}dxdy \quad (1)$$

where
$A_f$ is the complex amplitude of the light at the front focal plane
$A_b$ is the complex amplitude at the back focal plane
$x,y$ and $\omega_x,\omega_y$ are the coordinates of the front and back focal planes, respectively.

Figure 1:
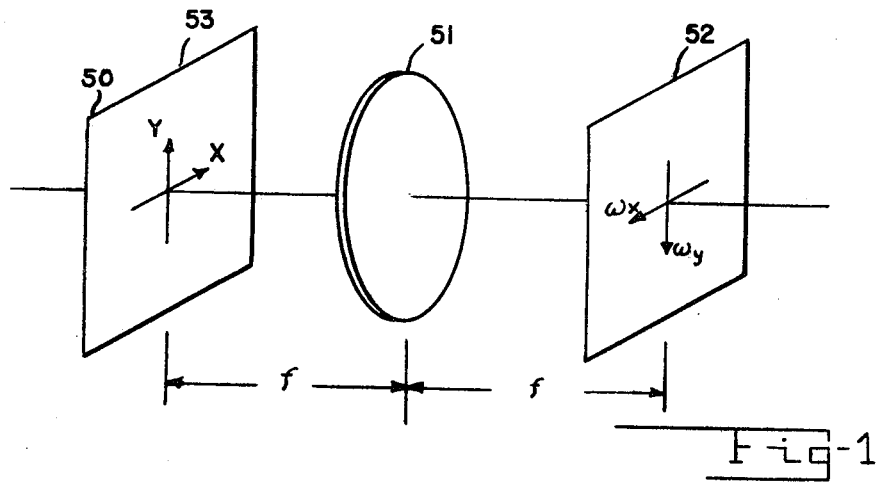
FIG. 1 is a three-dimensional view showing the Fourier transformation of the signal $f(x,y)$.

Referring now to the drawings wherein like elements in the various figures are given like reference numbers, in FIG. 1 if a signal is written as a density variation on a transparency 50, such as a photographic film located at the front focal plane of a lens 51, such that the transmittance of film is $s(x,y)$ and if the film is coherently illuminated, then, the light distribution at the back focal plane indicated as 52 is a two-dimensional Fourier transform $s(\omega_x,\omega_y)$ of $s(x,y)$.

Figure 19:
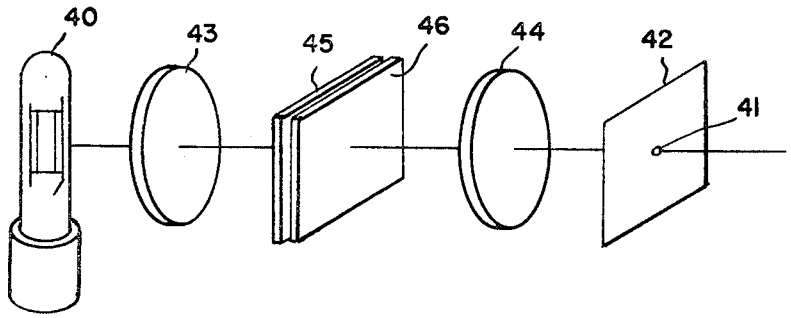
FIG. 19 shows a monochromatic light source which may be used in the device of the invention.

Refering now to FIG. 2, monochromatic light from a point source 54 described in detail with reference to FIG. 19 is collimated by a lens 55 so that to illuminate the function $s(x,y)$ on film 50 the Fourier transform of $s(x,y)$ will be displayed at plane 52. The lens 56 will then take the inverse transform which will be displayed at plane 57 where we again find $s(x,y)$. In the language of optics we see that the lens combination 51 and 56 has produced an image of $s(x,y)$ at 57. For the purpose of this disclosure, planes 53 and 57 will be indicated as spatial domain, in analogy with the time domain of communication theory, and plane 52 as the spatial frequency domain or, in short, the frequency domain.

In each of these domains there exists a spatial distribution of light energy upon which multiplicative operations may easily be performed. Transparencies of specified transmissivity placed in one of these planes will effect a multiplication in the corresponding domain. The transparency performs as a filter and construction of the proper transparency constitutes the filter synthesis problem.

The transparencies described here can be complex. By this is meant that the transparency can modulate either the amplitude or phase of the incident light. Suppose that the transparency has an amplitude transmissivity $|A(x,y)|$, defined as the ratio of the square root of the ratio of emergent to incident light intensity. The square root is taken, because the coherent optical system is linear with respect to the light amplitude which is proportional to the square root of intensity. Suppose, further, that the transparency retards the phase of the transmitted light in accordance with the relation $$\Psi = \Psi(x,y) \qquad (2)$$

The transparency then is said to have the complex transmittance:

$$A(x, y)e^{j\Psi(x, y)} \qquad (3)$$

Figure 2:
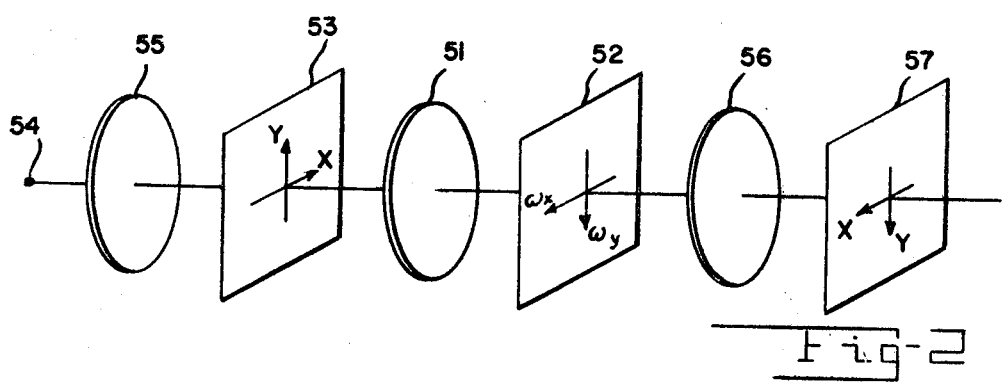
FIG. 2 shows a three-dimensional view similar to that shown in FIG. 1 wherein an inverse transform of $f(\omega_x,\omega_y)$ is produced.

Suppose a transparency $R(\omega_x,\omega_y)$ with complex transmittance to be inserted in the plane 52 of FIG. 2 effecting the operation $$V(\omega_x,\omega_y) = S(\omega_x,\omega_y)R(\omega_x,\omega_y) \qquad (4)$$

where $S(\omega_x,\omega_y) = T[s(x,y)] = $ Fourier transform of $s(x,y)$. This is a filtering operation, and the transparency $R = |R| \exp\{\Psi\}$ is a filter which modifies the spectral content of the signal $s(x,y)$. The amplitude variation, R, is obtained by varying the optical density of the transparency: the phase portion is obtained by varying the thickness of the transparency, and hence the phase retardation. At 57, the signal is transformed back to the spatial domain, and is given by:

$$v(x,y) = \iint s(x-\alpha, y-\beta)r(\alpha,\beta)d\alpha d\beta \qquad (5)$$

where $$r(x,y) = T[R(\omega_x,\omega_y)] \qquad (6)$$
$$v(x,y) = T[V(\omega_x,\omega_y)] \qquad (7)$$

This is a convolution integral.

The transparency R in simple form may consist of a slit or other aperture. Such apertures are low-pass or band-pass spatial filters. A stop becomes a band-rejection filter. The use of a phase plate causes a phase shift of a portion of the spectrum with respect to the remainder. This is the principle of phase contrast microscopy. Complex filter functions are possible, and it appears that one has independent control over both phase and amplitude, so that essentially any filter function can be synthesized.

As an alternative to inserting a transparency 58 at 52 (the frequency domain), a transparency $r(x,y)$ also with complex transmittance, can be introduced into the spatial domain at 53. If provision is made for translating $s(x,y)$ in the $x$–$y$ plane, relative to $r(x,y)$, the signal at 57 becomes $v'(x',y',\omega_x,\omega_y) = T[s(x-x\iota, y-y')r(x,y)]$. Here $x'$ and $y'$ measure the lateral displacement between $s$ and $r$. At the position $\omega_x = \omega_y = 0$, the integral becomes $$V'(x',y') = \iint s(x-x', y-y')r(x,y)dxdy \qquad (8)$$

which has the form of a cross-correlation. By reversing the coordinate system of $s$, i.e., $$x - x' \to x' - x$$
$$y - y' \to y' - y$$

one obtains the convolution integral $$V'(x',y') = \iint s(x'-x, y'-y)r(x,y)dxdy \qquad (9)$$

This is identical in form with Equation 5. Therefore, two methods are available for synthesizing a required transfer function.

(1) The frequency domain synthesis, in which a complex transmittance function (called a filter) is introduced in the frequency domain, 52, and operates directly on the frequency spectrum; and (2) The spatial domain synthesis, in which a complex transmittance function (called a reference function) is introduced in the spatial domain, 53, and operates directly upon the signal function.

The two techniques, therefore, produce the same result, as indeed they should. The display is different, however. With the frequency domain operation, an area display is produced, in which the variables $x,y$ are the coordinates of the plane 57. With the spatial-domain operation, the output display is only a point (viz., $\omega_x = \omega_y = 0$) and the coordinates $x',y'$ are generated as functions of time by physical displacement of $(s)$ with respect to $(r)$. The latter instrumentation requires a scanning mechanism; the former or filter technique does not.

It is possible and often advantageous to divide a required operation $(s)$ into two portions, one carried out in the spatial domain and the other in the frequency domain. The output at plane 57 becomes $$T\{T[s(x,y)r_1(x,y)]R_2(\omega_x,\omega_y)\} \qquad (10)$$

where $r_1$ is a reference function, inserted at 53 or spatial domain, the $R_2$ is a filter function, inserted at 52, or frequency plane.

The optical systems discussed thus far perform a two-dimensional operation. This feature is useful if the signal is a function of two variables, for then the signal can be displayed as a two-dimensional function and processed simultaneously in both variables. An electronic system, having only time as the independent variable, would require a scanning technique to perform the two-variable operation.

More often, the signal is one-dimensional in nature and the additional variable is not required. In such a case, the second variable can be used to provide a multiplicity of independent channels so that many one-dimensional signals can be processed simultaneously. The signals to be processed are written as $s_y(x)$, and are stacked on the transparency with respect to the $y$-variable. The resultant transparency is thus of the form $s(x,y)$ as before, except now $y$ is a parameter, which takes on as many values as there are independent channels to process. The limit on this is, of course, the number of resolvable elements possible across the $y$-dimension of the optical system aperture.

The processing is to be done with respect to the $x$-variable only. The $y$-dimension channels must remain separated. The optical system of FIG. 2, when modified as shown in FIG. 3, performs in the required manner.

Figure 3:
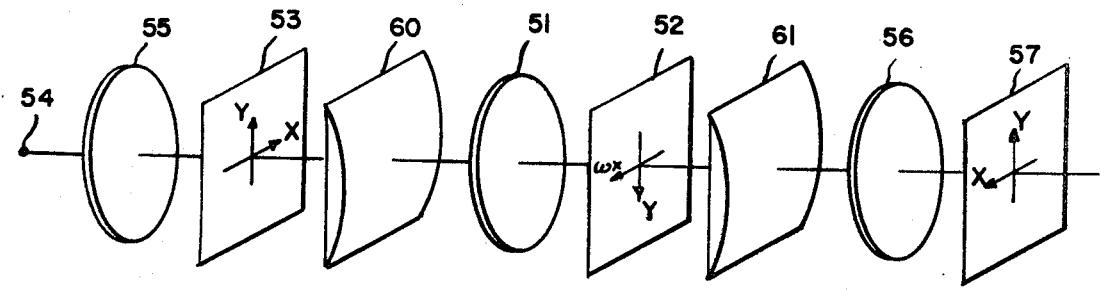
FIG. 3 shows a three-dimensional view usnig cylindrical lenses for producing a single transformation in one coordinate direction and a double transformation in the other coordinate direction.

In FIG. 3 the coordinate system $x,y$ is again at 53 as before. Then if we wish a display $s(\omega_x,y)$ at 52, we must effect a Fourier transform with respect to $x$ only and preserve the $y$-dimension. A cylindrical lens 60, which has focal power in one dimension only, can effect a one-dimensional Fourier transformation. To display the $y$-dimension at 52, it is necessary to image the signal at 53 on place 52 which constitutes a double Fourier transformation between 53 and 52 with respect to the $y$-variable. The cylindrical lens 60 in combination with the spherical lens 51 is placed between 53 and 52. The cylindrical lens exerts focal power in the $y$-dimension only and by itself produces a Fourier transformation with respect to $y$. The lens 51 by itself introduces a two-dimensional Fourier transformation; therefore, the two lenses in combination produce a double transformation with respect to $y$ and a single transformation with respect to $x$. Coordinate system $(\omega_x,y)$ therefore appears at 52. Ideally, of course, we should like to have the $y$-dimension at 53 transferred directly to 52. This is possible only by imaging 50 at 52 which, of course, implies a double Fourier transformation.

A filter element $R(\omega_x,y)$ inserted at 52 may be interpreted as a multichannel one-dimensional filter which processes each channel independently. A cylindrical lens 61 placed between 52 and 57 acts together with lens 56 to provide a second transformation with respect to $\omega_x$. Thus, the output at 57 displays the input function after modification by the filter at 52.

A simplification is possible if the signals in all channels are to be processed identically. Separation of the channels at the plane 52, or frequency plane, is no longer necessary. In this event, the cylindrical lenses are not required and the optical system reverts to that of FIG. 2. The function displayed at the frequency plane 52 is, as earlier, $S(\omega_x,\omega_y)$. The filter element takes the form $R(\omega_x)$, being independent of $\omega_y$. The function displayed at plane 57 is modified with respect to the $x$-dimension frequencies only. The operation can be written as $$v(x,y) = T[S(\omega_x,\omega_y)R(\omega_x)] \qquad (11)$$
$$= \int s(x-\alpha,y)r(\alpha)d\alpha$$

As in the two-dimensional processor, the required transfer function can be synthesized in the spatial domain. The optical system of FIG. 3 suffices, except that the output is taken at 52, and the portion of the system beyond this plane is not required. The integral evaluated when a slit is placed along the line $\omega_x=0$ is $$V'(x',y') = \int s(x-x',y)r(x,y)dx \qquad (12)$$

where, as before, $y$ is a parameter providing multichannel operation.

Instrumentations which require only one-dimensional processing need be coherent in one dimension only. Therefore, in the optical systems described in this section, the point source of illumination can be replaced by a line source, oriented parallel to the $y$-dimension. This is of tremendous practical advantage, because the available light flux can be increased by several orders of magnitude.

More complicated optical systems can be obtained by displaying successive transform planes. At each plane, a transparency is placed. Starting with a system like that of FIG. 2, a signal $s(x,y)$ is inserted at 53. At plane 52, a transparency $R_1(\omega_x,\omega_y)$ is inserted. At 57, the incident light flux displays the operation $$T[R_1(\omega_x,\omega_y)T[s(x,y)]] \qquad (13)$$

were T designates a Fourier transformation. Now suppose a transparency $r_2(x,y)$ be placed at 57 and that the optical system is extended to include additional lenses and additional transform planes are displayed. Finally, if the output is taken from the $n$th plane, the output is $$\left.\begin{array}{l}s_0(x,y)\\ s_0(\omega_x,\omega_y)\end{array}\right\} = \cdots T[r_2(x,y)T[R_1(\omega_x,\omega_y)[Ts(x,y)]]] \qquad (14)$$

where the output is a spatial domain function $s_0(x,y)$ if $n$ is odd and a frequency domain function $S_0(\omega_x\omega_y)$ if $n$ is even. The resultant transfer function is one that in general cannot be produced by a single spatial or frequency domain operation. In fact, a transfer function produced by $n$ successive transforms in general cannot be duplicated by a system employing fewer than $n$ successive transforms.

Some of the successive transforms can be made with respect to one dimension only, as in FIG. 3. Thus, we can have between some intermediate planes, for example, $P_k$ and $P_{k+1}$, either (1) a spherical lens
(2) a spherical lens and a cylindrical lens, with axis of revolution along the $x$-direction
(3) a spherical lens and a cylindrical lens, with axis of revolution along the $y$-direction.

These three possibilities produce, respectively, between $P_k$ and $P_{k+1}$ (1) a two-dimensional Fourier transformation, symbolized by $T_{x,y}$
(2) a one-dimensional Fourier transformation, with respect to the $x$-dimension, and symbolized by $T_x$
(3) a one-dimensional Fourier transformation, with respect to the $y$-dimension, and symbolized by $T_y$.

The output of the optical system, after a number of successive transformations, might be written, for example, as $$\left.\begin{array}{l}s_0(x,y)\\ s_0(x,\omega_y)\\ s_0(\omega_x,y)\\ s_0(\omega_x,\omega_y)\end{array}\right\} \cdots r_3(x,y)T_y[r_2(x,\omega_y)$$
$$T_x[r_1(\omega_x,\omega_y)T_{x,y}[s(x,y)]]] \qquad (15)$$

Which of the four possible output forms is obtained depends upon the number of successive transforms made in each dimension between input and output planes.

In radar, range resolution is normally obtained by radiating a narrow pulse. However, in a technique called pulse compression, a pulse of comparatively long duration is radiated. This pulse, however, is frequency modulated and, because of this, can be compressed to a fraction of its initial duration by appropriate filtering. As an example, a pulse of 2.5 microseconds linearly frequency modulated through 10 megacycles can be compressed, by the appropriate filter to 0.1 microsecond. This permits a range resolution of 50 feet, in contrast to the 1250 feet that one expects from a 2.5 microsecond pulse. For a full discussion see The Bell System Technical Journal, Volume XXXIX, No. 4, July 1960, pages 745–808.

Beam sharpening, which is another technique known to the radar art, is a similar procedure but applied to the radar beamwidth. A side-looking, airborne coherent radar scans a section of terrain and stores the return from successive pulses. Over a period of $n$ pulses, the antenna moves a distance $l$. By properly processing the pulse sequence, the resulting resolution can be made as good as that obtainable from an antenna of length $l$. Angular resolution considerably finer than a radar beamwidth is thereby possible. An example of this can be found in the Blikken et al. application, Ser. No. 26,916.

These two operations, pulse compression and beam sharpening, are compatible; both may be used together in a single radar system. The received pulses would be compressed, and then stored for the beam sharpening operation.

In the invention described here, however, the pulses are stored in the uncompressed form, and then pulse compression and beam sharpening are carried out simultaneously, as a single, two-dimensional operation, through the use of a coherent optical system.

Figure 4:
FIG. 4 is a graphical illustration of a radar signal from a point scatterer.

Each range-sweep is stored as a line trace on a transparent medium, such as photographic film. Successive traces are stored side-by-side, so that a two-dimensional signal record is constructed, with range displayed in one dimension, and the flight-path direction displayed in the other dimension. The recorded signal from a point scatterer is shown in FIG. 4. For general radar returns, the signal record would appear as in FIG. 5, which is a superposition of signals of the form seen in FIG. 4. In general, target signals can be displaced in azimuth as well as in range, although in FIG. 5 they are displaced in range only. In other words, FIG. 5 represents returns from a line of targets perpendicular to the aircraft flight path.

Figure 5:
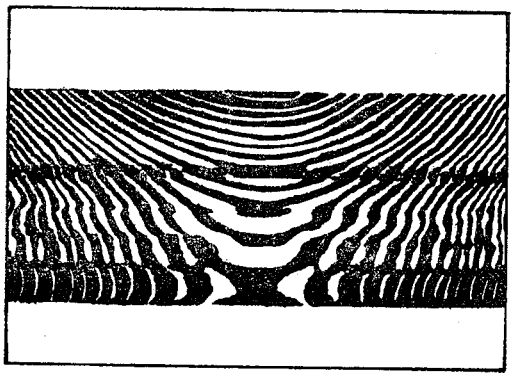
FIG. 5 is a graphical illustration of a radar signal from several point scatterers separated in range.
Figure 6:
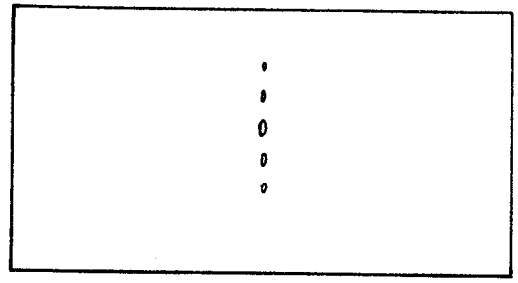
FIG. 6 is a graphical illustration of a signal such as shown in FIG. 5 after being processed with one of the devices of this invention.

When the signal of FIG. 5 is inserted in the coherent optical system, the individual, overlapping signals are each compressed to a fine spot as shown in FIG. 6. Signals which before overlapped are now completely separated. Resolution improvements in both range and azimuth dimensions have been obtained.

Various optical systems for performing the two-dimensional operation are possible. In all of these, the optical system behaves analogously to an electric filter. The spectrum of the signal is modified in the appropriate manner so as to produce the observed compression. The process can be regarded as being a two-dimensional matched-filtering operation analogous to the well known matched-filter operation of communication theory.

The radar return as recorded on the signal transparency is, for a point target, of the form $$S(x,r) = S_b + \sigma \cos\left[\omega_c x + \frac{kx}{r_1}(x-x_1)^2 + \phi(r-r_1)\right] \quad (16)$$

where $S_b$ is a bias term, required so that negative values of signal can be recorded as transmittance
$\sigma$ is a measure of the target cross-section.
$\omega_c$ is a bias or offset frequency, sometimes required.
$x_1, r_1$ determines the position of the signal on the signal film and is related to the ground coordinates of the radar target.
$x, r$ are the target coordinates of the film record.
$k_x$ is a constant, determined by the system parameters, for example, aircraft velocity, etc.
$\phi$ is the pulse coding term.

The recorded signal from an arbitrary radar field is a superposition of such signals, with different values of $x_1$ and $r_1$.

The operation of compressing the signal in both $r$ and $x$ dimensions is mathematically a two-dimensional cross-correlation of the signal with a two-dimensional reference function which is a replica of the signal expected from a point target. Alternatively, the operation is equivalently describable as a matched-filter operation.

The optical systems for performing the operation can assume various forms, all basically variants of the optical systems described in FIGS. 2 and 3. The required operation can be synthesized on a spatial domain basis, on a frequency domain basis, or on a combination of the two.

In the frequency domain synthesis the Fourier transform of the signal on film 50 is produced and is multiplied by a transparency having a transmittance which is the complex conjugate of the signal spectrum. Since the azimuth signal is a function of range of the target, each range element requires a different matched filter. By use of an astigmatic optical system shown in FIG. 7, displays of the signals $s(\omega_x, r)$ and $s(x, \omega_r)$ become available at planes 52 and 64, respectively, wherein $r$ is the variable formerly denoted by $y$. As can be seen from FIG. 3, the lens combination 51 and 60 processes the signal $f(x,r)$ to provide a Fourier transform of $x$ and the inverted image of $r$ in plane 52. The filter element placed at 52 consists of a slit 65 which removes the undesired frequency bands and a modified conical lens 66, which will be explained later, phase adjusts the transmitted light properly. The slit 65 takes the shape of the conical lens 66. While this has been disclosed as a modified conical lens for the present case, other shaped lenses might be required for processing other signal data.

The light incident at 52 is described by the Fourier transform, with respect to the $x$-variable, of the signal S:

$$S(x,r) = S_b + \sigma \cos\left[\omega_c x + \frac{kx}{r_1}(x-x_1)^2 + \phi(r-r_1)\right]$$

$$= S_b + \frac{\sigma}{2} \exp j\left[\omega_c x + \frac{k}{r_1}(x-x_1)^2 + \phi(r-r_1)\right]$$

$$+ \frac{\sigma}{2} \exp -j\left[\omega_c x + \frac{k}{r_1}(x-x_1)^2 + \phi(r-r_1)\right] \quad (17)$$

The light at 52 consists of three separate $x$ images: undiffracted light at $\omega_x = 0$, and two sidebands, corresponding to the two exponential terms. The slit removes the undiffracted light and one of the exponential terms. The conical lens is, except for amplitude, the matched filter for the remaining sideband of light. If the sidebands are designated S+ and S−, respectively, then the light distribution at 52 is $$T_x[S_b] + T_x[S+] + T_x[S-] \quad (18)$$

Suppose that the term $T_x[S-]$ is passed by the slit. Then the conical lens takes the form.

$$T_x\left[\exp j\frac{k}{r_1}x^2\right] \quad (19)$$

which is the complex conjugate of the $x$-varying portion of the signal.

The modified conical lens is a modification of a lens shown in the Axicon article by Mr. McCleod of the Journal of the Optical Society, August 1954, pages 593 to 598. The conical lens required for the frequency domain synthesis should have a focal length $$f_{\omega_x} = f_1^2/f_x \quad (20)$$

where $f_x$ is the focal length of the signal history in the azimuth dimension. Since $f_x$ is proportional to the range, we have $f_x = kr$, and $$f_{\omega_x} = kr \quad (21)$$

The modified conical lens, therefore, must have a focal length inversely proportional to range. This type of lens can be made from the lens described in the Journal of the Optical Society article referenced above in the manner as will be described with reference to FIG. 8.

Let collimated light impinge on the top surface of a prism having refractive index $\mu$. If a segment of the prism surface makes an angle $\phi$ with a horizontal, the incident ray is bent through an angle $\alpha = (n-1)\phi$, where $\phi$ is the angle tangent the surface makes with the $r$-axis. The segment of the curve then has the focal length $$f_{\omega_x} = r\alpha \quad (22)$$

but $\alpha = (n-1)\phi = (n-1)\tan\phi$ (for angles of $\alpha$ less than 10°). While in FIG. 8 the angle $\alpha$ appears to have values greater than 10°, in actual practice the focal length $f$ is much greater than that shown in FIG. 8 with the showing in FIG. 8 being merely for the purpose of illustration. The angle $\alpha$ will always be less than 10°.

Figure 8:
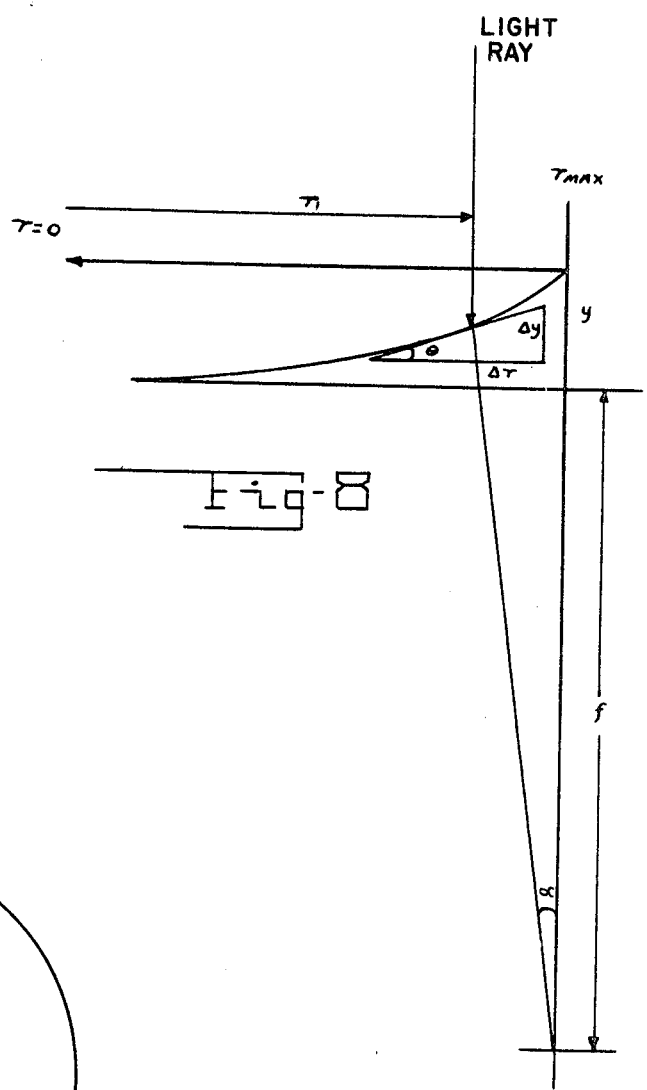
FIG. 8 is a diagram explaining the construction of the modified conical lens.

As can be seen from FIG. 8

$$\tan\phi = \frac{\Delta y}{\Delta r} = \frac{dy}{dr} \text{ as } \Delta r \to 0 \quad (23)$$

therefore $$f_{\omega_x} = r(n-1)\frac{dy}{dr} \quad (24)$$

or $$(n-1)dy = f_{\omega_x}\frac{dr}{r} \quad (25)$$

This is a differential equation which gives the required curve for an arbitrary range variation of focal length and with $f_{\omega_x} = k/r$ we have $$(n-1)dy = \frac{k}{r^2}dr \quad (26)$$

or $$y = \frac{-k}{r(n-1)} = \frac{k_2}{r} \quad (27)$$

Figure 9:
FIG. 9 shows a front elevation view of the modified cone from which the modified conical lens is obtained.

Hence, to get the required lens surface, a lens as described in the Journal of the Optical Society article is constructed so that the surface variation in the radial direction is in accordance with the above equation as shown in FIG. 9.

Figure 10:
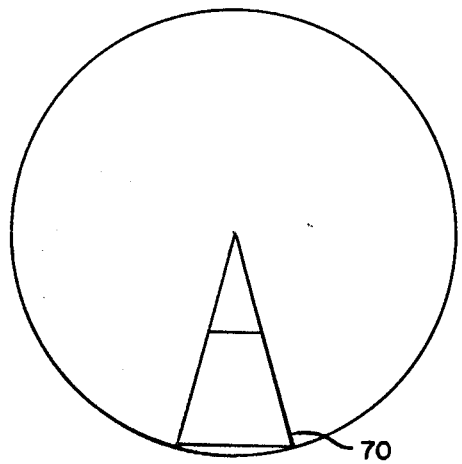
FIG. 10 shows a top view of the cone of FIG. 8 indicating the conical section taken.

To obtain the modified conical lens, a section 70 shown in FIG. 10 is cut from the lens shown in FIG. 9.

The modified conical lens is the complex conjugate of the signal $$\exp\text{-j}\frac{k}{r_1}(x-x_1)^2$$

Since the displacement factor $x_1$ does not affect the transformation, the filter need not include the displacement term $x_1$. The $\omega_c x$ factor can be placed in the modified conical lens term or left out; this is a matter of no consequence, since it represents only a constant frequency. The lens 67 results in a two-dimensional Fourier transformation between the planes 52 and 64 so that the signal $S(x,\omega_r)$ is available at 64.

At 64, a phase plate of specified shape is placed introducing the phase adjustment $T_1[\exp\text{-j }\phi(r)]$ which is a complex conjugation for the term $\exp\text{-j }\phi(r-r_1)$. The term $r_1$ is left out of the filter for the same reason as indicated above for the term $x_1$.

The lens system 68 and 69 result in a Fourier transformation with respect to $\omega_r$ so that the two-dimensional processed signal $S(x,r)$ is displayed at 57. Appropriate output means such as a film 59 will be located at 57. The relative speeds of the signal film 50 and the output film 59 are determined in the manner described in the Blikken et al. application referred to above.

The spatial domain synthesis consists of cross-correlating the recorded radar signal with a two-dimensional reference function. The cross-correlation implies a scanning of one function across the other. The x-dimension or (azimuth dimension) scan is obtained by movement of the signal film through the optical system aperture in the usual manner.

Figure 11:
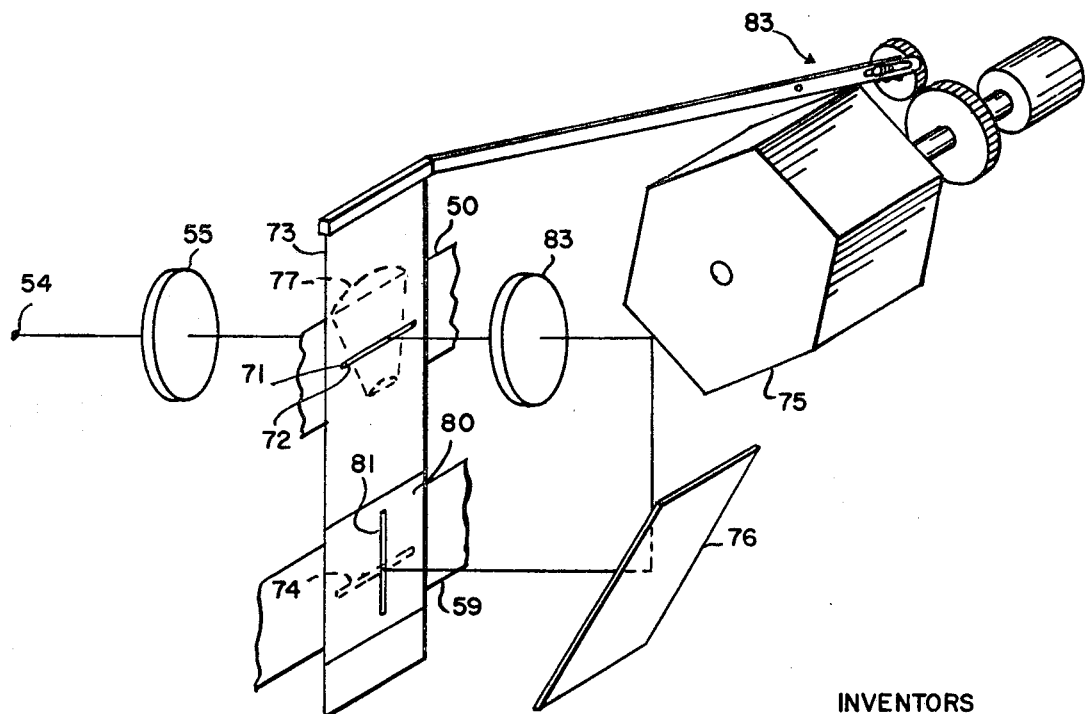
FIG. 11 shows a three-dimensional view of an optical system for processing radar data in the spatial domain.

Special means must be provided to produce the range dimension scan as shown in FIG. 11. The signal film 50 is illuminated by collimated light from light source 54 and collimating lens 55 as has been described previously. Conical lens 77 is superimposed on the signal film to correct for the change of focus with range. The shape the lens 77 takes is that of the section such as 70 shown in FIG. 10 taken from the conical lens described in the Journal of the Optical Society article referenced above. The conical lens 77 is the complex conjugate of the azimuth portion of the signal extended in the range direction in the spatial domain. The range scanning slit 71 in mask 73 is of the same width as one range element on signal film 50 and has a phase plate 72 therein. The shape that the phase plate takes is determined by the radar pulse coding and with linear frequency pulse modulation coding no phase plate is necessary. Output film 59 is located below film 50 and a second range scanning slit 74 is located in mask 73 to scan the output film in synchronism with the scanning of the signal film 50. The processed light output from signal film 50 is directed onto output film 59 by means of a rotating element 75 having mirrored surfaces and a reflecting mirror 76. Rotation of element 75 is synchronized with movement of mask 73 by means of a mechanical linkage indicated generally at 83. Since rotating element 75 is shown as a six-sided figure, the mechanical linkage must be such that the ratio of movement of the mask 73 to element 75 shall be six to one. A lens 84 is provided to bring the output of slit 71 to a focus at slit 81 in mask 80, which is located adjacent mask 73 and output film 59.

While a single lens is shown for bringing the output from slit 71 to a focus at 81, additional lenses may be provided between scanning element 75 and mirror 76 or between mirror 76 and output film 59 which would act together with lens 84 to bring the light to a focus at 81. These additional lenses may be either positive or negative lenses as required. Since the direction of movement of slit 74 in mask 73 will not be in the direction of motion of light from rotating element 75 during the return stroke of mask 73, the output film will be effectively blanked during the return stroke. The particular range scanning mechanism illustrated in FIG. 11 is not intended to be limiting since it is obvious that many other systems for providing the range scanning will be obvious to those skilled in the art.

For the particular radar signal shown in FIG. 5, it is most practical to process partially in the spatial domain and partially in the frequency domain. One such possibility is shown in FIG. 12. A conical lens 77, which is the same as described with reference to FIG. 11, is superimposed on the signal appearing at 53. The conical lens is the complex conjugate of the azimuth portion of the signal extended in the range direction in the spatial domain. The lens 51 provides a two-dimensional transformation which is displayed at 52. A slit 78 and phase plate 79 similar to that shown in plane 64 of FIG. 7 are located at 52 and are a matched filter for the range portion of the signal as described previously. The lens 56 then provides a two-dimensional transformation between 52 and 57 so that the two-dimensional processed signal is displayed at 57. The output appears as a spot of light in the range dimension but as a line in the azimuth dimension and the high resolution in the azimuth is generated as a function of the position of the signal film. A mask 80 having a slit 81 extending in the r-direction is placed adjacent the output film 59 located at 57. Illumination of the slit as a function of time as the signal film is moving across the processing system conical lens 77 produces a high resolution output.

FIG. 13 shows another configuration which may be used to process partially in the frequency domain and partially in the spatial domain. The configuration in FIG. 13 produces a higher light utilization efficiency than that shown in FIG. 12. In the device of FIG. 13, complete processing in the azimuth dimension can be considered as being completed at 53 and thus the slit 81 may be omitted providing a cylindrical lens 82 is placed between 52 and 59, which effectively reduces the line of light to a point. The exact location of lens 82 is not critical as long as it is properly located to give a sharp image at 59.

The systems thus far described assume a general pulse code. If we consider the specific use of linearly frequency modulated pulse, the system may be somewhat simplified. The recorded signal from a point target then becomes what is known in optics as a zone plate as shown in FIG. 4. These zone plates are in general astigmatic, that is, they have different focal properties in the range and azimuth dimensions. For this special case, the matched filter synthesis reduces to the process of bringing the light emerging from the separate zone plates shown in FIG. 5 to a focus and compensating for the astigmatism present in the zone plates by means of an astigmatic optical system. The range dimension range functions and phase plate filter become cylindrical lenses. These cylindrical lenses do not have to be in the spatial or frequency planes but can be at any intermediate plane. The spatial domain synthesis now results in an area display instead of a point display, making it similar to the frequency domain synthesis; thus no range dimension scanning is required.

Figure 14:
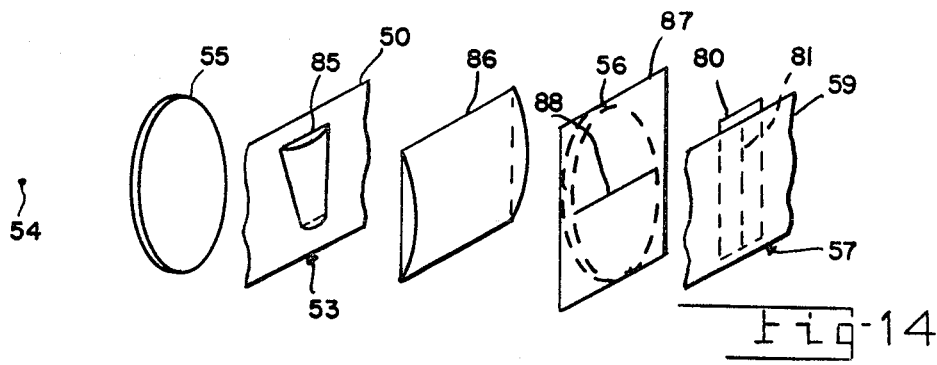
FIG. 14 is a three-dimensional view of an optical system for processing radar data from a system using linearly frequency modulated pulses.

One optical system which may be used for processing a signal such as shown in FIG. 5 is shown in FIG. 14. Light from the point source 54 is collimated by lens 55 in the same manner as previously described. This light then impinges upon the conical lens 85 and signal film 50 containing a signal $s(x,r)$. The signal appearing on film 50 consists of a number of overlapping zone plates with astigmatic focal properties such as shown in FIG. 5. The conical lens 85 compensates for the x-dimension focal properties of the zone plate signal so that the negative focal length first order diffracted images from the signal film plane are collimated in the x-dimension for all ranges. The lens 86 has no effect in the azimuth dimension. The lens 56 then brings this collimated light to a focus at 57 for all ranges.

Somewhere between the lens 86 and the plane 57 there is a plane where the center image focuses in the range or vertical dimension. At this plane appears the range dimension spectrum of the zone plate signals. The position of this plane is determined by the focal properties of lenses 86 and 56 and the spacing between these lenses.

A mask 87 having a slit 88 extending in the azimuth direction is placed here and is adjusted in width so as to pass only one of the first order diffracted images, i.e., that one which is collimated between lenses 85 and 86. This slit adjusts the bandpass of the optical system to that of the signal spectrum thereby optimizing the signal-to-noise ratio of the signal at 57. An output sampling slit 81 extended in the range direction is located adjacent output film 59.

Figure 15:
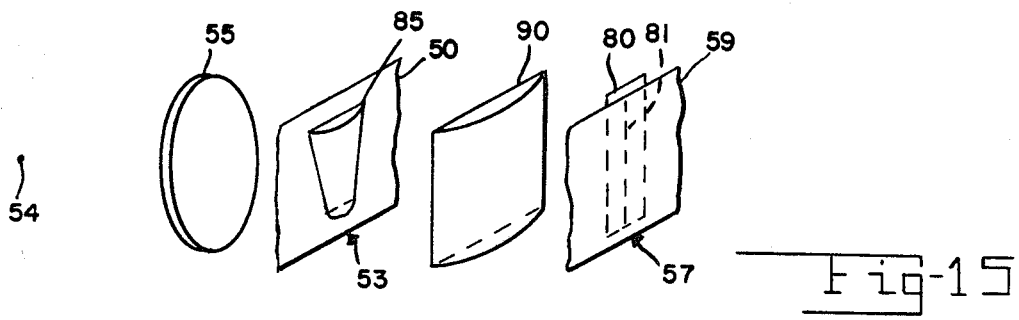
FIG. 15 is a three-dimensional view of a modification of the device of FIG. 14.

In FIG. 15, light from point source 54, which is collimated by lens 55, impinges upon the combination of signal film 50 and conical lens 85 in the same manner as in FIG. 14. As in FIG. 14, one of the first order diffracted beams emerges from the signal film collimated in the x-dimension. The light is convergent in the range dimension and comes to a focus at 57. A cylindrical lens 90 makes the collimated light in the azimuth dimension convergent also so that the light is brought to a focus in both dimensions at 57. A mask 80 having a vertical slit 81 is placed adjacent film 59 to reject the undesired portion of light which does not focus in plane 57.

Figure 16:
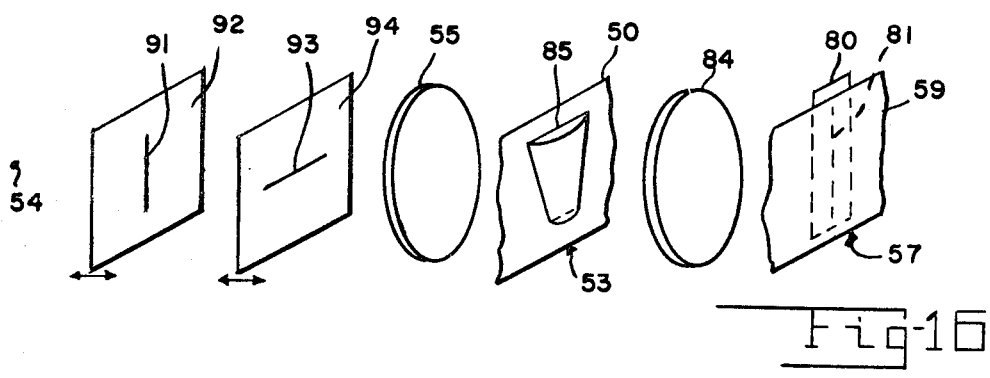
FIG. 16 shows a further modification of the device of FIG. 14 using an astigmatic light source.
Figure 17:
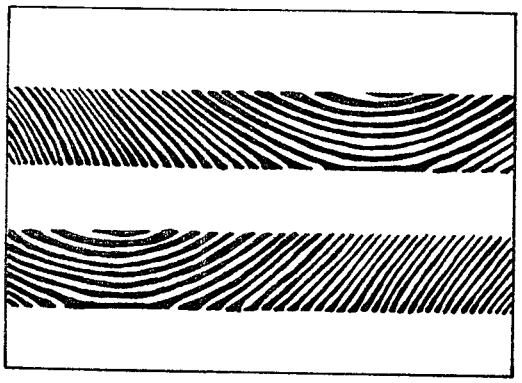
FIG. 17 is a graphical illustration of a recorded radar signal from targets separated in azimuth and range.
Figure 18:
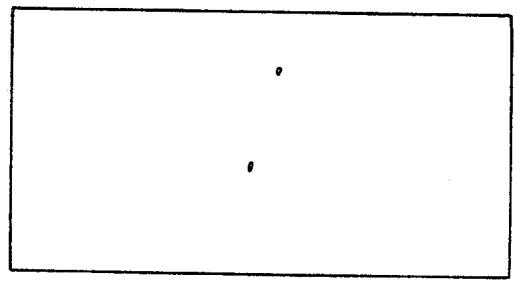
FIG. 18 is a graphical illustration of a signal such as in FIG. 17 after being processed with one of the devices of the invention.

In FIG. 16, the astigmatic properties of the zone plate are compensated for by means of an astigmatic light source. In this figure, illumination is derived from a pair of cross slits not in the same plane. In the x-dimension, light proceeds from source 54 through the slit 91 in mask 92 and passes through the slit 93 in mask 94 and is collimated by lens 55. The conical lens 85 compensates as before for the x-dimension focus of the signal so that one of the first order diffracted beams emerges from the signal film 50 conical lens 85 combination collimated in the x-dimension. For the range dimension light emerging from the slit 93 is collimated upon emerging from the signal film 50 by a combination of the lens 55 and the range dimension focal properties of the zone plate signals on signal film 50. The light leaving the signal film 50 and lens 85 combination is therefore collimated in both dimensions and is brought to a focus in both dimensions at 57 by lens 84. As before, a slit 81 placed adjacent film 59 samples the light and rejects the portion of light which does not focus here. Thus, when a signal such as appears in FIG. 5 is inserted in a system such as shown in FIGS. 14, 15 or 16 the individual overlapping signals are each compressed to a fine spot as shown in FIG. 6. Signals which have been overlapped are now completely separated. Resolution improvements in both range and azimuth dimensions have been obtained. While these signals have been shown as separated in range only, signals separated in azimuth as well, such as shown in FIG. 17, may be processed by the systems shown in FIGS. 14, 15 and 16 to produce the processed signal data as shown in FIG. 18. However, the information shown in FIG. 17 will appear in a small incremental distance along the length of the showing of the processed data in FIG. 18.

The light source indicated as 54 is shown in FIG. 19. Light from the source 40 is imaged upon aperture 41 in a mask 42 by a pair of lenses 43 and 44. The diameter of aperture 41 is determined by a compromise between image sharpness and total light intensity and may be between 20 microns and 250 microns. A heat reflecting filter 45, to keep heat from passing to the film and an optical filter 46 to provide monochromatic light are located between lenses 43 and 44. The light passing aperture 41 is monochromatic light coherent in both range and azimuth.

This invention achieves a reduction of the radar ambiguity problem by combining beam sharpening and pulse compression into a single, two-dimensional operation and utilizing the properties of two-dimensional filters.

Figure 20:
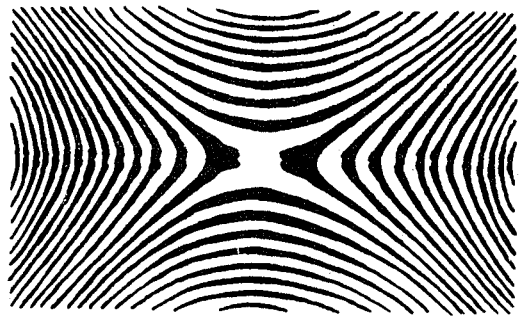
FIG. 20 is a graphical illustration of a Doppler radar signal folded in both range and azimuth.

To transmit a signal of bandwidth W normally requires a channel of the same bandwidth. If the frequency range of the signal after conversion to video extends from O to W, the video channel must also extend from O to W. However, if the conversion to video were such that some frequency $f_0$ in the band were converted to zero, then all frequencies lower than $f_0$ will be reflected, or folded, about the zero-frequency position, so that the frequencies $f_0+\Delta f$ and $f_0-\Delta f$ both become $\Delta f$. The frequencies thus folded can be regarded as negative frequencies. FIG. 20 shows a Doppler radar signal folded in both range and azimuth. Such folding would be tolerable if the channel could distinguish between the positive and negative frequencies. By folding the spectrum about the midfrequency, one could then reduce the video bandwidth to $W/2$. However, to distinguish the positive from negative frequencies, it is necessary to process both inphase and quadrature signal components; hence, two channels are required.

If a signal is two-dimensional, a fold-over in one of the two dimensions becomes possible without resort to a two-channel system, because the two components of the signal spectrum interact in such a way that positive and negative frequencies can be distinguished in one dimension, provided there is no fold-over in the other dimension. To illustrate, consider the two-dimensional signal $$\cos(\omega_x x + \omega_y y) \qquad (28)$$

where $\omega_x$ and $\omega_y$ are the x- and y-dimension radian frequencies, respectively. If $\omega_x$ and $\omega_y$ are both positive, or both negative, the resultant signal appears as in FIG. 21a, and the two-dimensional Fourier spectrum appears as in FIG. 21b. However, if $\omega_x$ and $\omega_y$ differ in sign, the signal appears as in FIG. 22a, and the Fourier spectrum as in FIG. 22b. Thus, for example, if $\omega_x$ is known to the positive, the sign of $\omega_y$ can be deterbined by inspection of either the signal or its transform.

This phenomenon has application to high-resolution radar. The ability to distinguish positive from negative frequencies means that, for one of the two dimensions, the bandwidth can be reduced by half and the spectrum folded upon itself. This possibility can be exploited in many ways.

First, the pulse spectrum can be folded, thus reducing the bandwidth of the system from the video section of the radar to the optical processor. There are three consequences to this choice. First, a bandwidth reduction in the video channel is now possible; for example, a 10 mc. channel would behave as a 20 mc. channel. Also, in the recording processing, the cathode-ray tube behaves as if it had twice its actual number of resolvable spots along a line trace. Finally, the optical system aperture can be reduced by half; thus, a 70 mm. optical system can be replaced by a 35 mm. system.

If the pulse spectrum is not folded, then there is the possibility of coding the signal in such a way as to reduce the radar ambiguity problem.

The ambiguity problem in Doppler radar arises from two opposing requirements on the pulse repetition frequency. This must be high enough to sample the Doppler frequencies properly, and it must be low enough so that returns are not received simultaneously from different ranges. If these conditions are not both met, ambiguities result. These can be in range, in Doppler frequency (i.e., azimuth), or both.

The ambiguity reduction techniques are of two sorts, those that reduce range ambiguities and those that reduce Doppler or azimuth ambiguities. These are shown in FIGS. 23 to 27. FIG. 23 shows the conventional case where no ambiguity reduction techniques are used.

Two ways of reducing range ambiguities are possible. The maximum range can be doubled by folding the Doppler spectrum, which permits the pulse repetition frequency to be reduced by half. This choice is shown in FIG. 22 which shows the signal after the foldover.

The systems shown in FIGS 14, 15 and 16 may be used to process a signal such as that shown in FIG. 24 since it is the same as that shown in FIG. 4 and in the upper half of FIG. 20. However, with signals using other than linear frequency modulated pulse recording systems such as shown in FIGS. 7, 12 and 13 will be required.

In a second method of doubling the range performance, the pulse repetition frequency is not reduced, the Doppler spectrum foldover does not occur. Instead, an ambiguity in range is accomplished. By proper demodulation techniques the ambiguity can be suppressed.

Suppose the Doppler frequencies vary from 0 to $f_{max}$ and the pulse repetition frequency is at least equal to $2f_{max}$ (i.e., no Doppler ambiguity exists) then if a radiated pulse of the form $$P_1(t) = \cos \omega t + \phi(t - nT) \quad (29)$$

is followed by one of the form $$P_2(t) = \cos \{\omega t - \omega_m + \phi t - (n-t)T\} \quad (30)$$

where $\phi$ is the pulse coding function and $\omega_m$ is equal to the maximum Doppler frequency. The near and far range targets may be separated in the following manner.

Figure 21A:
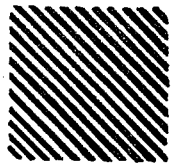
FIG. 21a shows a signal history where components $\omega_x$ and $\omega_y$ are positive or both negative.
Figure 21B:
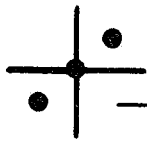
Figure 22A:
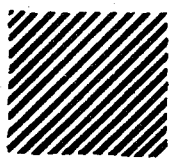
FIG. 22a shows a signal history where one of the components $\omega_x$ and $\omega_y$ is positive and the other is negative.
Figure 22B:
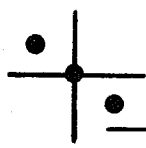
Figure 28:
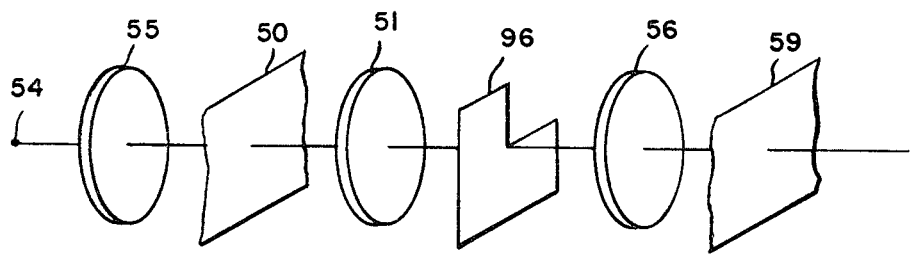
FIG. 28 shows an optical system for removing ambiguity from the Doppler radar information stored on a film.

When the near range targets are returning the $P_1(t)$ pulses the far range targets are returning the $P_2(t)$ pulses and, when the near range targets are returning the $P_2(t)$ pulses the far range targets are returning the $P_1(t)$ pulses. During the interval between the radiated pulses of $P_1(t)$ and $P_2(t)$, the return is beat with the frequency $\cos \omega t$ so that the far range targets vary between $-\omega_m$ to 0 and the near range pulses vary from 0 to $\omega_m$. During the interval between the radiated pulses of $P_2(t)$ and $P_1(t)$, the return is beat with the frequency $\cos \omega t - \omega_m$ so that the far range targets again vary between $-\omega_m$ to 0 and the near range targets vary between 0 to $\omega_m$. Thus, the far range targets will always produce negative frequencies and the near range targets will always produce positive frequencies. The near range and far range recorded signals for targets at different ranges will thus be as shown in FIG. 25. The former has its spectrum in the odd number quadrants as shown in FIG. 21a and the second in the even number quadrants as shown in FIG. 22a. Therefore, a filter can accept signals in one range while rejecting the other to perform this function. A filter 96 may be located at 52 in FIG. 2 as shown in FIG. 28. The signal thus appearing at 57 will then be of the type shown in FIG. 23 with the ambiguities removed. This then may be processed by any of the systems described previously by proper location of the output slit. While the device of FIG. 28 has been described as using separate elements to perform the quadrant filtering, this may be accomplished in any plane where one of the two frequencies is resolved such as in the device of FIG. 7. Quadrant filtering in the $\omega_x$ direction may be accomplished at 52 and $\omega_r$ filtering may be accomplished at 64.

To process targets in both ranges it will be necessary to process the film twice with a different quadrant filter used in each processing system.

In FIG. 26 the Doppler spectrum is folded so that the frequency band of interest expands from $-\frac{1}{2}f_m$ to $\frac{1}{2}f_m$ instead of from 0 to $f_m$. Now, if Doppler frequencies from $-\frac{3}{2}f_m$ to $\frac{3}{2}f_m$ are allowed and the pulse repetition of $2f_m$ is used, the frequencies $-\frac{3}{2}f_m$ to $-\frac{1}{2}f_m$ and from $\frac{1}{2}f_m$ to $\frac{3}{2}f_m$ become image frequencies. These are ordinarily removed by the azimuth band rejection slit which may be the output slit 81 (or may be the slits 65 or 78 in FIGS. 7 or 12).

In FIG. 27 the pulse repetition frequency is maintained at $2f_m$ but the spectrum is not folded. The image frequencies are generated by the Doppler frequencies between $-f_m$ to 0 and from $f_m$ to $2f_m$. The former are obviously negative frequencies and analysis shows that the latter likewise become negative frequencies when sampled at the rate $2f_m$. These then may be removed by a quadrant filter such as shown in FIG. 28 in the manner described with respect to FIG. 25.

An alternative way of regarding the two-dimensional signal $f(x,y)$ is to consider it as a function of a single variable $x$, with the second variable $y$ acting as a parameter which changes the initial phase of the $x$-dimension portion of the signal. As $y$ is varied, all possible initial phases are obtained, among these are components which are in quadrature. The two-dimensional filtering operation which separates the positive and negative frequencies can therefore be regarded as a process for combining quadrature components of the signal (as well as all other components intermediate in initial phase). This viewpoint suggests a technique of folding a one-dimensional spectrum and recovering the original function.

Figure 29:
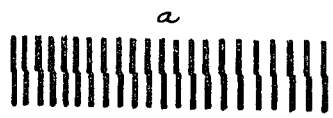
FIG. 29 shows quadrature component signals which may be processed with the device of FIG. 28.

Given a one-dimensional function, let quadrature components be recorded side-by-side, as in FIG. 29. Here FIG. 29a shows the quadrature components of a positive frequency, while FIG. 29b shows the quadrature components of a negative frequency. FIG. 30 shows the result of passing the signal through the quadrant filter described earlier. When the filter is arranged to pass positive frequencies, the result appears as in FIG. 30a. FIG. 30b shows the result for a negative-pass filter.

When a synthetic-antenna type radar is mounted side-looking in an aircraft which flies a straight-line path, a difficulty arises if one attempts to generate too long a synthetic antenna. The range to a point target will change by some appreciable amount during the time it is in the physical radar beam. If this change in range is greater than the range resolution of the radar, the stored return from the target will not be entirely in the same range bin. If the return is stored on photographic film, the signal history will be recorded along a section of a parabola instead of along a straight line, which is the normal case. Processing the signal so as to achieve beam sharpening then means that the integration of the signal will have to be carried out along a curved path instead of the straight path. This invention comprises two ways of meeting this problem. In one way, the integration actually is carried out along the required arc; in the other, beam sharpening and pulse compression are combined so as to produce in effect the required curved-path integration.

In the first technique, a conical lens is used to permit integration along an arc. The recorded signal from a point target at range $r_1$ is approximately of the form $$s(x,r) = \delta(r - r_1) \cos [\omega_c x + k/r_1(x - x_1)^2] \quad (31)$$

(where $\delta$ is the Dirac delta function) if the radiated pulse is narrow, and $$s(x,r) = \cos [\omega_c x + k/r_1(x - x_1)^2 + \phi(r - r_1)] \quad (32)$$

if pulse coding is used. If $r_0$ is the minimum range to the target, we have the range to the target given as $$r_1 = r_0 + \frac{1}{2}x^2/r_0 \quad (33)$$

Substituting this into the above relations gives $$s(x,r) = \delta(r - r_0 - \frac{1}{2}x^2/r_0) \cos [\omega_c x + k/r_1(x - x_1)^2] \quad (34)$$

or, if pulse coding is used $$s(x,r) = \cos [\omega_c x + k/r_1(x - x_1)^2 + \phi(r - r_0 - \frac{1}{2}x^2/r_0)] \quad (35)$$

In the first case, the signal is recorded along a parabolic line on the signal record. In the second case, the extent of the signal in the $r$-dimension may be considerably greater than the change in range $\frac{1}{2}x^2/r_0$, so that the change in range is negligible by comparison. However, the factor $\frac{1}{2}x^2/r_0$ within the pulse coding term represents a coupling between the $x$ and $r$ variables, and analysis shows that this coupling term leads to exactly the same limitations as does the curvature of signal history in the former or uncoded pulse case.

If the Fourier transform with respect to $r$ is taken on these signals, there results $$e^{j\omega_r(r_0 + \frac{1}{2}x^2/r_0)}T_r \cos [\omega_c x + k/r_1(x - x_1)^2 + \phi(r - r_0)] \quad (36)$$

and $$e^{j\omega_r x^2/2r_0} T_r \cos\left[\omega_c x + k/r_1(x-x_1)^2 + \phi(r-r_0)\right] \quad (37)$$

In a plane where $T_r[s(x,r)]$ is displayed, suppose a function $\exp -j\omega_r x^2/2r_0$ is placed. This compensates for the $\exp j\omega_r x^2/2r_0$ term of the signal. If now, a transformation back to the $x,r$ plane is made, the signal becomes $$s(x,r) = \delta(r-r_0) \cos\left[\omega_c x + k/r_1(x-x_1)^2\right] \quad (38)$$

or $$s(x,r) = \cos\left[\omega_c x + k/r_1(x-x_1)^2 + \phi(r-r_0)\right] \quad (39)$$

and the range variation term has been eliminated. The signal can now be processed in the usual manner.

The function $\exp -j\omega_r x^2/2_0$ can be described as the negative of the modified conical lens or phase plate as described in connection with FIG. 7. If we consider a horizontal segment $\omega_r = \omega_{r_0} = $ constant, this segment has the focal length $$f = \frac{-2\pi r_0}{\omega_{r_0} \lambda}$$

where $\lambda$ is the wavelength of the light used. The focal length varies as $1/\omega_r$, i.e., each horizontal, or $\omega_r$ = constant, segment has a different focal length, hence the term conical lens.

Figure 31:
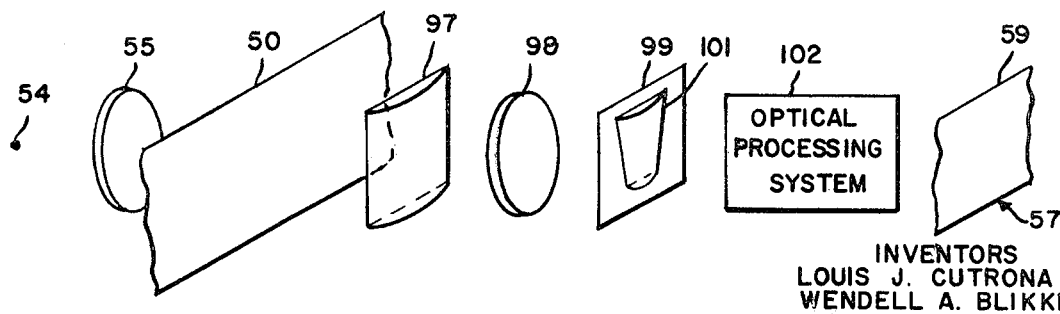
FIG. 31 shows a three-dimensional view of an optical system for use in range tracking.

In FIG. 31 light from a point source 54 is collimated by lense 55 and illuminates signal film 50 in the same manner as described previously. The lens combination 97 and 98 provides a double Fourier transformation in the $x$-dimension and a single Fourier transformation in the range dimension so that the signal $f(x,\omega_r)$ appears at 99. A conical lens 101 as described above then acts to compensate for the term $\exp j\omega_r x^2/2_0$. With the range variation term removed, the signal can then be processed by one of the appropriate processing systems described previously as indicated at 102 to provide the process output signal at 59. While the optical system for removing the range variation term has been shown separately from the optical processing system, it may be incorporated therein with the lens 101 located at any point where the signal $f(x,\omega_r)$ is displayed.

A second way of correcting for the quadratic change in range to the target is to combine pulse compression with the beam sharpening process and use a linearly frequency modulated pulse. The recorded signal has the form $$\cos\left[\omega_c x + k/r_1(x-x_1)^2 + k'(r-r_1)^2\right] \quad (40)$$

where, as before, $$r_1 = r_0 + \frac{1}{2}\frac{(x-x_1)^2}{r_0}$$

This gives $$\cos\left[\omega_c x + k/r_1(x-x_1)^2 + k'\left(r - r_0 - \frac{1}{2}\frac{(x-x_1)^2}{r_0}\right)^2\right] \quad (41)$$

$$\approx \cos\left[\omega_c x + k/r_1(x-x_1)^2 + k'(r-r_0)^2 - k'(r-r^0)\frac{(x-x_1)^2}{r_0}\right] \quad (42)$$

wherein the term $x^4$ has been dropped, since it is quite small. The final term, $$k'(r-r_0)\frac{(x-x_1)^2}{r_0}$$

represents a coupling between the $x$ and $r$ variables. Let this term be combined with the other term in $(x-x_1)^2$, producing $$\left[k/r_1 + k'\frac{r-r_0}{r_0}\right](x-x_1)^2 \quad (43)$$

The conical lens, or reference function, used for the beam sharpening process introduces the phase term $-k/r(x-x_1)^2$. When this term is added to the above, there results $$\left[k/r_1 - k/r + k'\frac{r-r_0}{r_0}\right](x-x_1)^2 \quad (44)$$

Making the approximation $r_1 \approx r_0$, and rearranging terms, we obtain $$(k+k'r)\frac{r-r_0}{rr_0}(x-x_1)^2 \quad (45)$$

By choosing a frequency modulated rate $k' = -k/r$ for the pulse modulation, the above term becomes zero, and the cross-product term, involving $x$ and $r$, disappears. Thus, the limitation on combined range resolution and azimuth resolution is reduced. It is not entirely eliminated, however, since the frequency modulated rate cannot vary with range. Therefore, one must choose a specific $r = r_a$. At this range, the cross-term can be zero, but at other ranges the term is not zero. Nevertheless, considerable improvement over extended range intervals can be had.

Physically, what has been done is to match the pulse frequency modulated rate to the Doppler frequency modulated rate. This results in the recorded signal from a point target being a zone plate with the same focal properties in both dimensions, hence, the designation "anastigmatic conduction." Such a zone plate has its phase contour lines circular instead of elliptical or hyperbolic.

Figure 32:
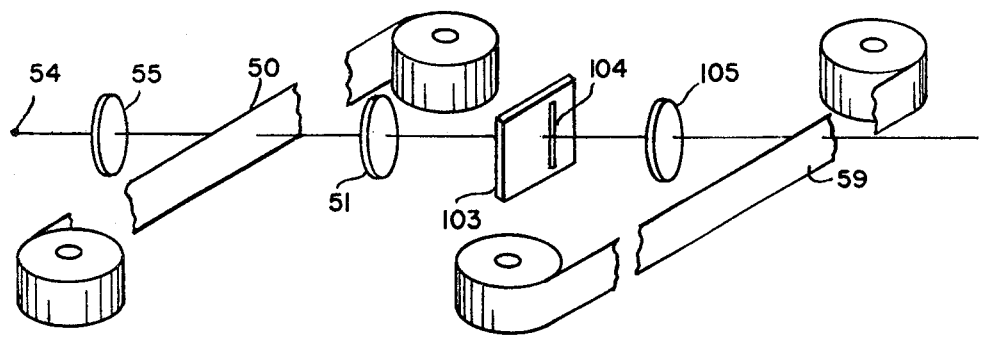
FIG. 32 shows a three-dimensional view of an optical system for processing Doppler radar signal wherein the pulse frequency modulation rate has been matched to the Doppler frequency modulation rate.

The processing system then reduces substantially to that shown in FIG. 1 as shown in FIG. 32. The optical system shown in FIG. 32 has a filter element 103 with slit 104 located at the position where one of the first order diffracted images comes to a focus. In practice, the mask 103 will not be located exactly at 52, for the reason described in connection with FIG. 9 of the Blikken et al. application referred to above. The output film 59 may be located adjacent mask 103 or the output at slit 104 may be imaged on film 59 by means of a relay lens 105. The film reels for moving the film through the optical system shown in this figure will be used with all of the systems described previously although they have not been shown.

Whereas a cylindrical lens and a spherical lens combination have been illustrated to provide a single Fourier transformation in one direction and a double Fourier transformation in the other direction, it is obvious that other lens combinations might be used to perform this same function.

There is thus provided a two-dimensional data processor for performing the operation of pulse compression and beam sharpening for radar data stored in the uncompressed form.

While certain specific embodiments have been described in detail, it is obvious that numerous changes can be made without departing from the general principles and scope of the invention.

We claim:

1. A device for processing frequency modulated radar information recorded as signal histories on a signal film having azimuth Doppler information extending in one direction and coded range information extending in the other direction, comprising; a point light source, a collimating lens between said point source and said signal film, a monochromatic filter between said light source and said collimating lens, means for moving said signal film through said light in the azimuth direction at a predetermined rate, an output film in light receiving relation to light passing through said signal film, means for moving said output film through said light in the azimuth direction at a predetermined rate relative to the movement of said signal film, signal processing means located in the path of the light passing through said signal film for multiplying the signal in the azimuth direction with the complex conjugate of the azimuth signal for each range, a second signal processing means located in the path of the light passing through said signal film for multiplying the signal in the range direction with the complex conjugate of the coded range signal on said film and means in the light path for removing all but one of the first order diffracted images of the signal on said signal film.

2. A device for processing frequency modulated radar information recorded as signal histories on a signal film having azimuth Doppler information extending in one direction and coded range information extending in the other direction, comprising; a point light source; a collimating lens between said point source and said signal film; a monochromatic filter between said light source and said collimating lens; means for moving said signal film through said light in the azimuth direction at a predetermined rate; an output film in light receiving relation to light passing through said signal film; means for moving said output film through said light in the azimuth direction at a predetermined rate relative to the movement of said signal film; lens means, between said signal film and said output film, for providing a double Fourier transformation in the range direction and a single Fourier transformation in the azimuth direction of the signal histories on said signal film; means, located in the azimuth frequency plane of said lens means, for multiplying the azimuth frequency signal at said plane by the complex conjugate of the azimuth frequencies at said azimuth frequency plane; a second lens means located between said multiplying means and said output film for providing a two-dimensional Fourier transformation of the light signal output of said multiplying means; a second means located at the range frequency plane of said second lens means for multiplying the range coded frequency information with the complex conjugate of the range coded frequency signal at the range frequency plane; means adjacent said second multiplying means for removing all but one of the first order diffracted images of the signal histories on said signal film; and a third lens means between said second multiplying means and said output film for providing a double Fourier transformation in the azimuth direction and a single Fourier transformation in the range direction of the signal output of said second multiplying means.

3. A device as claimed in claim 2 wherein the means for providing a double Fourier transformation in range and a single Fourier transformation in azimuth and the means for providing a double Fourier transformation in azimuth and a single transformation in range are each made up of a cylindrical-lens, spherical-lens combination.

4. A device for processing frequency modulated radar information recorded as signal histories on a signal film having azimuth Doppler information extending in one direction and coded range information extending in the other direction, comprising; a point light source; a collimating lens between said point source and said signal film a monochromatic filter between said light source and said collimating lens; means for moving said signal film through said light in the azimuth direction at a predetermined rate; means, adjacent said signal film, for correcting for the change of focus with range; an output film in light receiving relation to light passing through said signal film; means for moving said output film through said light in the azimuth direction at a predetermined rate relative to the movement of said signal film; means, located between said signal film and said output film for multiplying each range element on said signal film with the complex conjugate of the range coded signal on said signal film; means for blanking all of the area of the signal film except an area corresponding to the area of said multiplying means; means adjacent said output film for blanking all of the area of said output film except an area corresponding to the area of said multiplying means; means for scanning the light output from said signal film across said output film in the range direction, means for moving said light blanking means adjacent said signal film and the light blanking means adjacent said output film across the signal film and the output film respectively in synchronism with said light scanning means; a mask, adjacent said output film having a slit therein extending in the range direction; and means for bringing the light output of said signal film to a focus at said slit in said mask.

5. A device for processing frequency modulated radar information recorded as signal histories on a signal film having azimuth Doppler information extending in one direction and coded range information extending in the other direction, comprising; a point light source; a collimating lens between said point source and said signal film; a monochromatic filter between said light source and said collimating lens; means for moving said signal film through said light in the azimuth direction at a predetermined rate; means, adjacent said signal film, for correcting for the change of focus with range; an output film, in light receiving relation to light passing through said signal film, means for moving said output film through said light in the azimuth direction at a predetermined rate relative to the movement of said signal film, lens means, between said signal film and said output film, for providing a two-dimensional Fourier transformation of the signal histories on said signal film; means, located at the frequency plane of said lens means, for multiplying the range coded information on said film with the complex conjugate of the range signal history on said signal film; filter means adjacent said multiplying means for removing all but one of the first order diffracted images of the signal histories on said signal film; a lens between said multiplying means and said output film for providing a two-dimensional Fourier transformation of the signal output from said frequency plane; and means located adjacent said output film for sampling the processed light signal from said signal film.

6. A device for processing frequency modulated radar information recorded as signal histories on a signal film having azimuth Doppler information extending in one direction and coded range information extending in the other direction, comprising; a point light source; a collimating lens between said point source and said signal film; a monochromatic filter between said light source and said collimating lens; means for moving said signal film through said light in the azimuth direction at a predetermined rate; means, adjacent said signal film, for correcting for the change of focus with range; an output film in light receiving relation to light passing through said signal film; means for moving said output film through said light in the azimuth direction at a predetermined rate relative to the movement of said signal film; lens means, between said signal film and said output film, for providing a two-dimensional Fourier transformation of the signal histories on said signal film; means, located at the frequency plane of said lens means, for multiplying the range coded information on said film with the complex conjugate in the frequency domain of the range signal history on said signal film; filter means, adjacent said multiplying means, for removing all but one of the first order diffracted images of the signal histories on said signal film; and means for bringing the processed range and azimuth light signals to a focus at said output film.

7. The device as claimed in claim 6 wherein the means for bringing the processed signals to a focus at the output film is a spherical lens-cylindrical lens combination with the axis of the cylindrical lens extending in the range direction.

8. A device for processing linearly frequency modulated radar information on a signal film having azimuth Doppler information extending in one direction and linearly frequency modulated range pulse information extending in the other direction comprising; a monochromatic point light source for illuminating said signal film, means between said light source and said signal film for collimating the light from said source, means for moving said signal film through said light in the azimuth direction at a predetermined rate, means adjacent said signal film for correcting for the change of azimuth focus with range, an output film in light receiving relation to the light passing through said signal film, means for moving said output film through said light in the azimuth direction at a predetermined rate relative to the movement of said signal film, means between said light source and said output film for correcting for astigmatism in the signal information on said signal film and means located adjacent said output film for sampling the light passing through said signal film.

9. A device for removing range ambiguity from linearly frequency modulated radar recorded on a signal film, having recorded thereon as signal histories azimuth Doppler information extending in one direction and linearly frequency modulated range pulse information extending in the other direction, comprising; means for illuminating said film with monochromatic collimated coherent light, means for moving said signal film through said light in the azimuth direction at a predetermined rate, lens means for providing a Fourier transformation in azimuth and range of the signal histories on said signal film, a quadrant filter located at the frequency plane of said lens means, an output film in light receiving relation to the light passing through said signal film, means for moving said output film through said light in the azimuth direction at a predetermined rate relative to the movement of said signal film, means adjacent said signal film for correcting for the change of azimuth focus with range, means between said quadrant filter and said output film for correcting for astigmatism in the signal information on said signal film and means located adjacent said output film for sampling the light passing through said signal film.

10. A device for processing linearly frequency modulated radar information on a signal film, having azimuth Doppler information extending in one direction and linearly frequency modulated range pulse information extending in the other direction comprising; means for illuminating said signal film with monochromatic collimated light, means for moving said signal film through said light at a predetermined rate, means adjacent said signal film for correcting for the change of azimuth focus with range, an output means for receiving light passing through said signal film, an astigmatic optical system located between said film and said output means for correcting for the astigmatism in the signal on said signal film and means located adjacent said output means for sampling the light passing through said signal film.

11. A device for processing linearly frequency modulated radar information on a signal film, having azimuth Doppler information extending in one direction and linearly frequency modulated range pulse information extending in the other direction comprising; means for illuminating said signal film with monochromatic collimated coherent light, means for moving said signal film through said light at a predetermined rate, means adjacent said signal film for correcting for the change of azimuth focus with range, an output film in light receiving relation to the light passing through said signal film, means for moving said output film through said light at a predetermined rate relative to the movement of said signal film, an astigmatic optical system located between said signal film and said output film for correcting for the astigmatism in the signal on said signal film and means located adjacent said output film for sampling the light passing through said signal film.

12. A device for processing linearly frequency modulated radar information on a signal film having azimuth Doppler information extending in one direction and linearly frequency modulated radar pulse information extending in the other direction, comprising; a point light source, a collimating lens between said point source and said signal film, a monochromatic filter between said light source and said collimating lens, means for moving said signal film through said light at a predetermined rate, means adjacent said signal film for correcting for the change of azimuth focus with range, an output film in light receiving relation to light passing through said signal film, means for moving said output film through said light at a predetermined rate relative to the movement of said signal film, a means located between said signal film and said output film for providing a single Fourier transformation of the signal histories on said signal film in the azimuth direction and for providing a double Fourier transformation of the signal histories on said signal film in the range direction, and means located adjacent said output film for sampling the light passing through said signal film.

13. A device for processing linearly frequency modulated radar information on a signal film having azimuth Doppler information extending in one direction and linearly frequency modulated range pulse information extending in the other direction, comprising; a monochromatic point light source, a first mask having a first slit therein extending in the range direction spaced a predetermined distance from said light source, a second mask having a second slit therein extending in the azimuth direction spaced a predetermined distance from said first mask, a collimating lens between said second mask and said signal film, means for moving said signal film through said light at a predetermined rate, means adjacent said signal film for correcting for the change of azimuth focus with range, an output film in light receiving relation to light passing through said signal film, means for moving said output film through said light at a predetermined rate relative to the movement of said signal film, means located adjacent said output film for sampling the light passing through said film and means located between said signal film and said output film for bringing the light passing said signal film to a focus at said output film.

14. A device for removing range ambiguity from linearly frequency modulated radar recorded on a signal film, having recorded thereon as signal histories azimuth Doppler information extending in one direction and linearly frequency modulated range pulse information extending in the other direction, comprising; means for illuminating said film with monochromatic collimated coherent light, means for moving said signal film through said light at a predetermined rate, lens means for providing a Fourier transformation in azimuth and range of the signal histories on said signal film, a quadrant filter located at the frequency plane of said lens means, an output means for receiving light passing through said signal film, and a second lens means for providing a Fourier transformation in azimuth and range of the signal passing said quadrant filter.

References Cited

UNITED STATES PATENTS

| 2,143,059 | 1/1939 | Dimmick | 88—57 |
| 2,303,113 | 11/1942 | Eckel | 88—57 |
| 2,346,496 | 4/1944 | Lorance | 88—1 |
| 2,451,465 | 10/1948 | Barney | 343—100.7 |
| 2,746,833 | 5/1956 | Jackson | 88—24.9 |

OTHER REFERENCES

Pub. I: Data Processing by Optical Techniques by Cutrona et al., pp. 23 to 26 of 1959 Conference Proceedings of IRE National Convention on Military Electronics.

RODNEY D. BENNETT, JR., Primary Examiner

C. E. WANDS, Assistant Examiner

U.S. Cl. X.R.

343—5, 9, 17.2